United States Patent [19]

Mutoh et al.

[11] Patent Number: 5,667,205
[45] Date of Patent: Sep. 16, 1997

[54] FLUID-SEALED TYPE ANTI-VIBRATION RUBBER DEVICE

[75] Inventors: Yuji Mutoh; Kazutoshi Satori, both of Saitama, Japan

[73] Assignee: Yamashita Rubber Kabushiki Kaisha, Saitama, Japan

[21] Appl. No.: 566,427

[22] Filed: Nov. 30, 1995

[30] Foreign Application Priority Data

Mar. 22, 1995 [JP] Japan .................... 7-063154
Nov. 16, 1995 [JP] Japan .................... 7-298103

[51] Int. Cl.⁶ .................................................. F16F 13/00
[52] U.S. Cl. ................................. 267/140.13; 267/219
[58] Field of Search ...................... 267/140.11, 140.13, 267/35, 219, DIG. 3; 248/562, 636

[56] References Cited

U.S. PATENT DOCUMENTS 5,167,403  12/1992  Muramatsu et al. ............. 267/140.13

FOREIGN PATENT DOCUMENTS

| 59-117929 | 7/1984 | Japan ............. 267/140.13 |
| 60-97440 | 7/1985 | Japan . |
| 3-92639 | 4/1991 | Japan . |
| 3-181634 | 8/1991 | Japan . |
| 3-99251 | 10/1991 | Japan . |
| 4-165137 | 6/1992 | Japan . |
| 4-75252 | 6/1992 | Japan . |
| 4-75254 | 6/1992 | Japan . |
| 4-272532 | 9/1992 | Japan . |

*Primary Examiner*—Peter M. Poon
*Attorney, Agent, or Firm*—Birch, Stewart, Kolasch & Birch, LLP

[57] ABSTRACT

A long damping orifice 60 having a circular shape as viewed from above and a short linear idle orifice 61 are disposed and the orifices are connected by a common inlet 32, whereas an outlet side is formed separately into a first outlet 52 and a second outlet 53, which is opened and closed by a valve portion 21 which is in a unit with a diaphragm 7. Though the valve portion 21 is open by the negative suction-air pressure of an engine during idling, at this time, since the center of the second outlet 53 is shifted from the center of the valve body 21 toward a flowing direction of fluid flowing through the idle orifice 61, the valve portion 21 is open obliquely to prevent the turbulent flow of fluid in the vicinity of the second outlet 53, switching fluid-sealed mount characteristics rapidly.

11 Claims, 8 Drawing Sheets

FLUID-SEALED TYPE ANTI-VIBRATION RUBBER DEVICE

BACKGROUND OF THE INVENTION

1. Field of the Invention

The present invention relates to a fluid-sealed type anti-vibration rubber device such as a suspension-mount rubber and an engine-mount rubber of an automobile, which controls internal pressure by external means.

2. Description of the Prior Art

It is well known to form a liquid chamber by utilizing at least a portion of a rubber block and to divide the liquid chamber into two sections by a partitioning member, the two sections being communicated with each other by means of two separate orifices having different lengths and the orifices being used alternately.

By the way, since a valve for switching the orifices has its face closing orifice openings moving only horizontally up and down, such a problem is encountered that a turbulent flow of fluid is apt to occur in the vicinity of the orifice openings to hinder rapid switching of the orifices.

Also, since the orifices are respectively formed into a similar circular shape, a large partitioning member is indispensable to form two orifices while securing the sufficient passage length. Besides, when such two independent orifices are formed, an inlet and outlet must be provided for each orifice, requiring severe machining accuracy of the partitioning member and a high manufacturing workmanship.

SUMMARY OF THE INVENTION

In order to solve the above-mentioned problems, a fluid-sealed type anti-vibration rubber device according to the present invention comprises, a first connecting member mounted to either a car body side or a vibration member side, a second connecting member mounted to another side and a rubber block provided between the members, a closed space being formed between the first and second connecting members by utilizing a portion of the rubber block, which is divided into a plurality of liquid chambers by a partitioning member, the liquid chambers being communicated by an idle orifice, provided in the partitioning member and, having a large passage section area and a short passage, and a damping orifice having a small passage section area and a long passage, the idle orifice being open by a valve only during the idling and the damping orifice being open constantly, and the center of an outlet of the idle orifice being shifted from the center of the valve toward the flowing direction of the fluid flowing through the idle orifice.

In this case, the idle orifice may be extended linearly in the radial direction of the partitioning member and the damping orifice may take the form of a circular shape surrounding the idle orifice.

It is also possible that either one of the inlets or outlets of the idle orifice and damping orifice may be used commonly. Meanwhile, the outlet of the idle orifice may be opened and closed by the elastically deformable valve, and further the outlet may be opened and closed by a portion of a diaphragm. At least a portion of the rubber block constituting the liquid chambers may be easily made to be elastically deformable.

Meanwhile, the valve may be controlled by a negative pressure and a connecting pipe, connected to a negative pressure source, may be tilted obliquely toward the outlet side of the idle orifice, and further, the wall thickness of the valve may be formed thinner on the outlet side of the idle orifice than the opposite side.

It is also possible to form the valve by a portion of the diaphragm and to provide a metal plate for closing the outlet of the idle orifice in the valve, a stopper being provided at a contact between the metal plate and the diaphragm. In this case, a radius from the peripheral center of the metal plate may be set smaller on the outlet side of the idle orifice than the opposite side.

The valve may also be constituted by a portion of the diaphragm and a valve body, which are riveted by a rivet whose valve body side is covered by a rubber seal.

At the time of usual running condition, since the idle orifice is closed and only the damping orifice is communicating between the liquid chambers, appropriate attenuation characteristics and dynamic spring characteristics are exhibited by the damping orifice.

First, though a high attenuation must be obtained for comfortable ride against vibration in a low-frequency region (5 to 15 Hz), it can be realized by tuning a resonance point of the long damping orifice to the low-frequency vibration region.

If the valve is made elastically deformable and it is so tuned that the internal pressure rise in one liquid chamber at the time of resonance produced in the damping orifice can be absorbed by the elastic deformation, the internal pressure rise can be absorbed by the elastic deformation of the valve and the dynamic spring characteristics can be changed into a low dynamic spring.

Next, in the idle vibration region (20 to 40 Hz), when the valve is open, the idle orifice communicates between the liquid chambers, thereby a working fluid flows through the idle orifice to produce the resonance. And hence, the resonance point changes to the idle vibration region tuned to the idle orifice, thus a sufficient low dynamic spring condition can be obtained in this region.

At this time, since the outlet of the idle orifice is shifted toward the flowing direction of the fluid from the center of the valve, which can be open obliquely allowing the fluid to flow smoothly for rapid switching.

Furthermore, in an input vibration region above the idle revolution in the general running condition, though the idle orifice is closed and the resonance point of the damping orifice is not in the vibration region, if a movable wall portion is provided on the rubber block, the internal pressure can be absorbed by the elastic deformation.

In addition, when either one of the inlets or outlets of the damping orifice and idle orifice is used commonly, the machining accuracy of the partitioning member can be relaxed and the partitioning member can be made smaller. Also, when the valve is formed in a unit with the diaphragm, a special seal for the working fluid is not necessary.

Meanwhile, when the valve is controlled by the negative pressure and the connecting pipe connected to the negative pressure source is tilted obliquely toward the outlet side of the idle orifice, the valve can be open obliquely more reliably. Furthermore, when the wall thickness of the valve is formed thinner on the outlet side of the idle orifice than the opposite side, the valve can be opened obliquely in a more reliable manner.

Also, by providing a stopper at a contact between a metal fitting provided in the valve and the diaphragm, their abrasion can be prevented. Meanwhile, if a radius from the peripheral center of the metal plate is formed smaller on the outlet side of the idle orifice than the opposite side, the occupying ratio of the metal member of the valve body is smaller on the left-hand side than the right-hand side. As a result, a rubber elasticity on the left-hand side of the valve body becomes smaller, thus the left-hand side is tilted more to open easily.

Meanwhile, when the valve is controlled by the negative pressure and is formed by a portion of the diaphragm and the valve body, the diaphragm and the valve body being riveted by a rivet whose valve body side is covered by a rubber seal, an airtightness in the valve body can be secured reliably by the rubber seal even when the air-tightness of the rivet is not sufficient.

DETAILED DESCRIPTION OF THE PREFERRED EMBODIMENT

Figure 1:
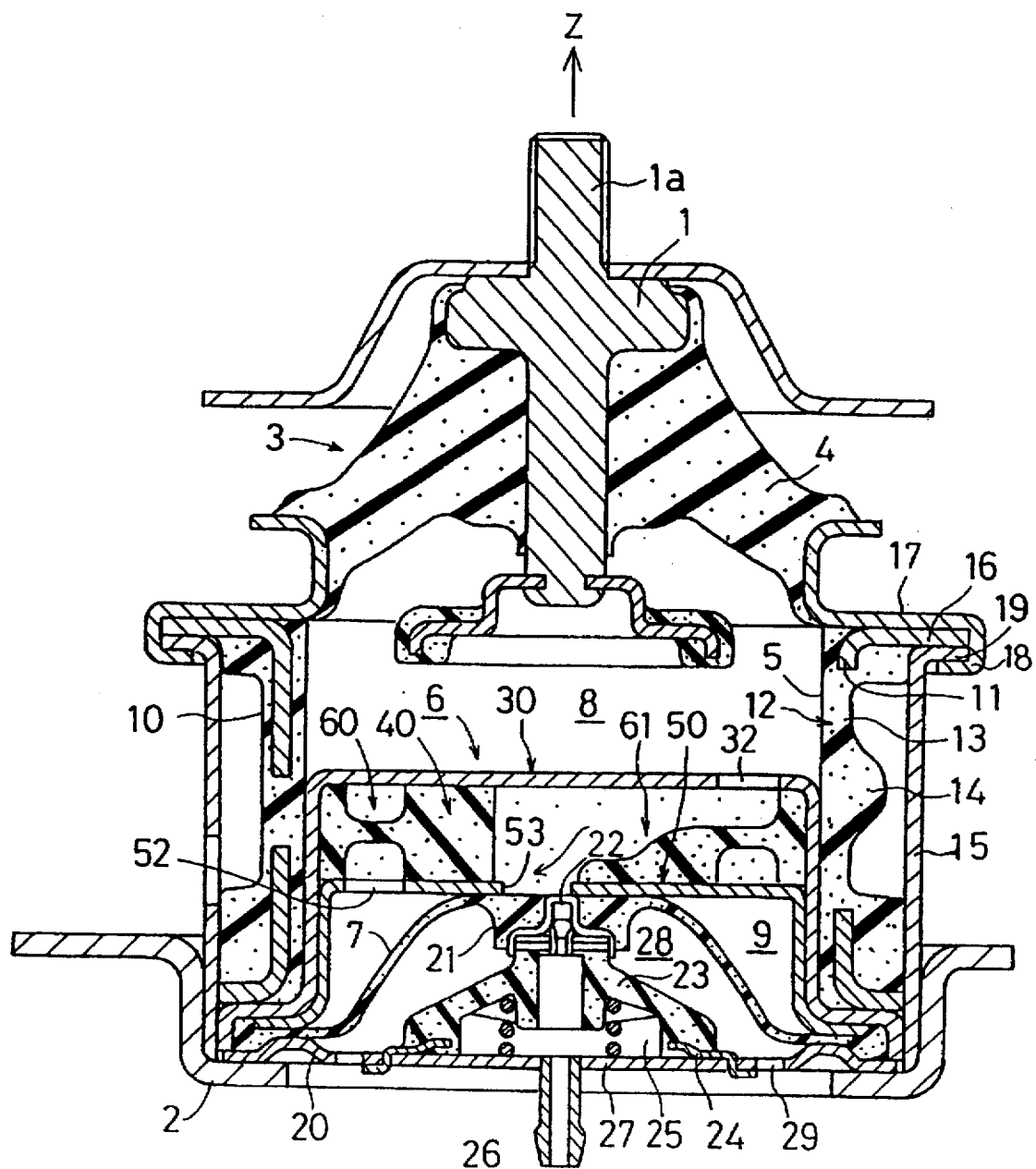
FIG. 1 is a longitudinal sectional view of an engine mount according to one embodiment mode of the present invention, FIGS. 2A, 2B and 2C constitute an exploded sectional view showing the three main portions of the partitioning member.

One embodiment mode constituted as an engine mount is described based on FIG. 1 through FIG. 7, wherein FIG. 1 is a longitudinal sectional view of the engine mount taken along a plane parallel to a main input direction Z of vibration to be prevented.

In FIG. 1, the engine mount comprises, a first connecting member 1 mounted to an engine as a vibration side by a bolt 1a and a second connecting member 2 connected to a car body side, which are connected by a cylindrical and approximately conical block body portion 4 provided at one end of a rubber block 3. Hereupon, the relationship of the connection between the engine side and car body side may be opposite.

A portion connected in a unit with the block body portion 4 of the rubber block 3 is formed into a thin cylindrical portion 5 and a diaphragm 7 is mounted to its open end side via a partitioning member 6. In an internal space surrounded by the rubber block 3 and the diaphragm 7, a liquid chamber consisting of a first chamber 8 and a second chamber 9 partitioned by the partitioning member 6 is formed.

An outer surface of the cylindrical portion 5 is borne by an inner cylinder 10 at a portion of which a hole 11 is formed to face a movable wall 12. The movable wall 12 comprises a thin portion 13 and a thick deformation restricting portion 14 whose pointed end protrudes into the hole 11 in proximity to an outer cylinder 15 provided around the inner cylinder 10 in a spaced interval to form a double wall.

An outer flange 16 formed at an upper end of the cylinder 10 is caulked, by an outer flange 18 formed on a connecting metal 17 which is in a unit with the block body 4, together with an outer flange 19 of the outer cylinder 15. Another end side of the inner cylinder 10 is pressed into the cup-shaped second connecting member 2 together with the outer cylinder 15 and the partitioning member 6 pressed into the cylindrical portion 5.

The diaphragm 7 is clamped between a lower end portion of the partitioning wall 6 and a press plate 20 overlapped inside the second connecting member 2, its center portion serving as a valve portion 21. The valve portion 21 is connected to a valve body 23 by a joint metal 22.

The valve body 23 is secured to the press plate 20 by a mounting plate 24 and forms a closed space 25 between the press plate 20, the closed space 25 being connected to a negative pressure source, not shown, by a connecting pipe 26. For example, it is connected to a downstream side of a carburetor of an engine to apply the negative suction-air pressure to the closed space 25. Hereupon, the negative pressure source is not restricted to the negative suction-air pressure, for example, a vacuum pump may also be used.

The negative pressure supplied to the closed space 25 is controlled by a microcomputer and the like (not shown), thereby constituting an external air control unit. In the case of present embodiment mode, the negative pressure is supplied to the closed space 25 only during idling to move the valve body 23 downward in the figure, thereby the valve body 21 is spaced from the partitioning member 6 to open the valve.

A return spring 27 is disposed in the closed space 25 to always urge the valve body 23 upward in the figure so as to keep the valve portion 21 in close contact with the partitioning member 6. A space 28 surrounded by the valve body 23 and the diaphragm 7 is open to the atmosphere through a hole 29 provided in the press plate 20.

As shown in FIG. 2 showing exploded sectional views of component parts, the partitioning member 6 is constituted by overlapping an external member 30, a passage member 40 and an internal member 50. In the figure, a section of the external member 30 is taken along the line II(A)—II(A) FIG. 6 and a section of the internal member 50 is taken along the line III—III of FIG. 7.

Figure 6:
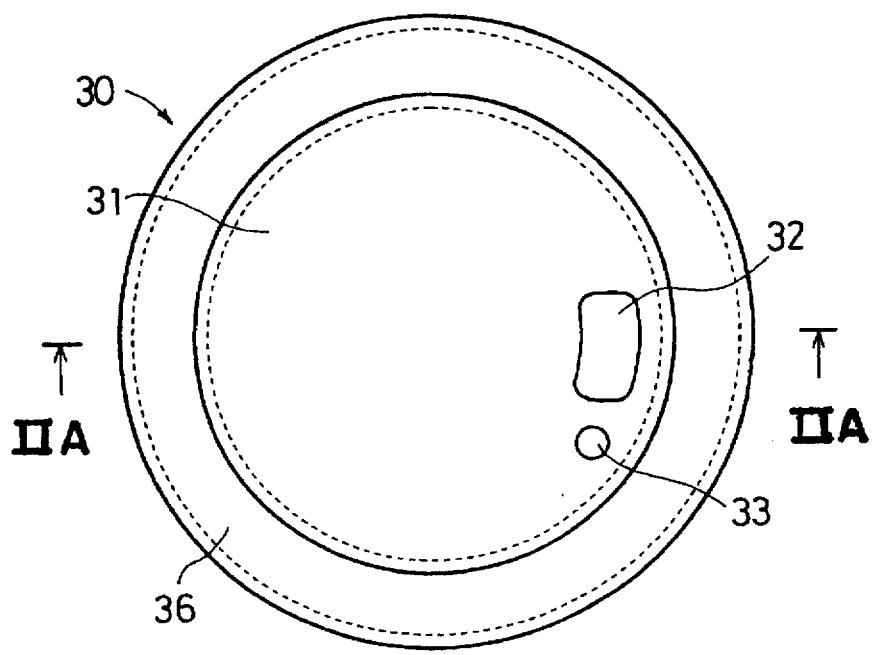
FIG. 6 is a plan view of an external member.

As shown also in FIG. 6, on an upper surface 31 of the external member 30 a common inlet 32 is formed, in the vicinity of which a positioning hole 33 is formed. As shown in FIG. 2, a side wall 35 is large enough to engage with an inner surface of the cylindrical portion 5 and its open end side is formed into an outer flange 36 having a bent portion 37 formed by bending its edge portion axially.

Figure 7:
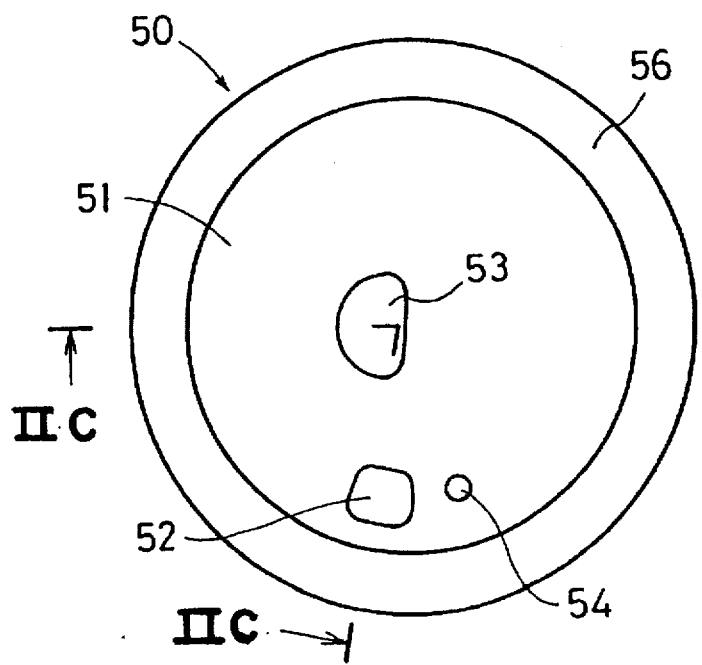
FIG. 7 is a plan view of an internal member.

As shown in FIG. 7, the internal member 50 has its upper surface 51 provided with a first outlet 52 at its peripheral edge portion, and a second outlet 53 at a position shifted from the center portion in a flowing direction of the fluid flowing through an idle orifice 61 (refer to FIG. 1), an opening area of the second outlet 53 is larger than that of the first outlet 52. A positioning hole 54 is open in the vicinity of the first outlet 52.

Figure 2A:
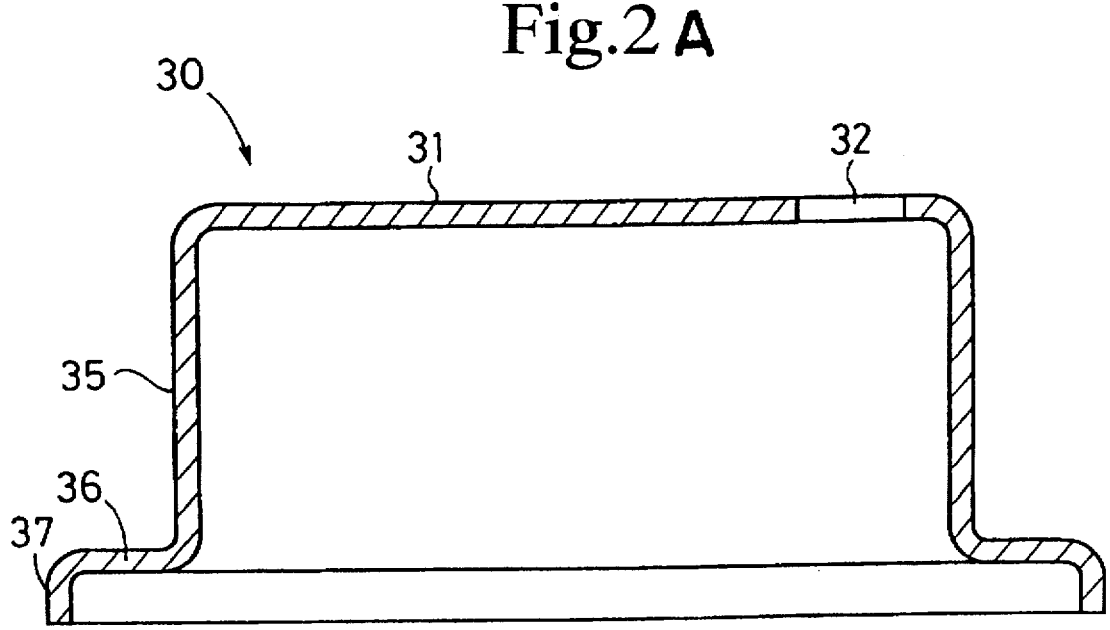
Figure 2B:
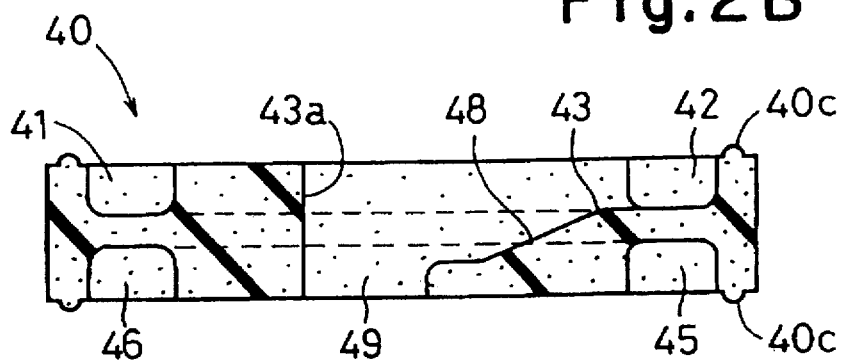
Figure 2C:
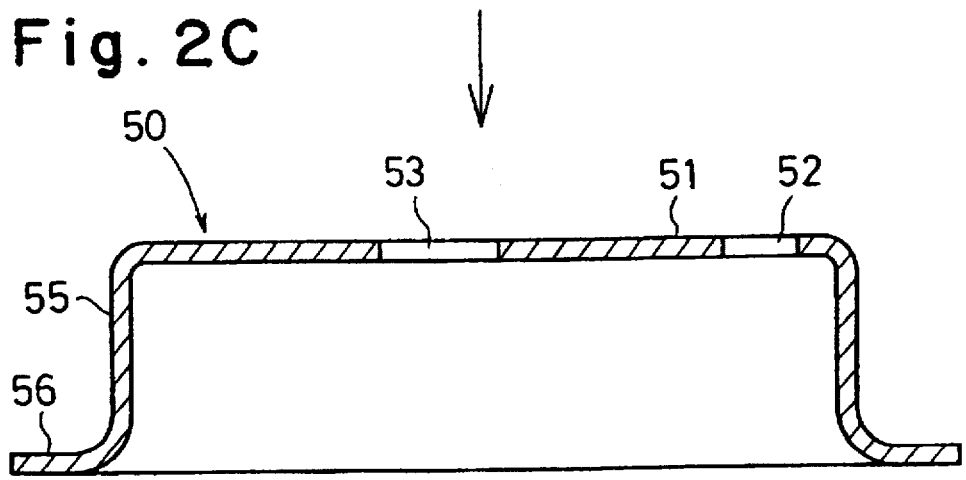

As shown in FIGS. 2A and 2C a side wall 55 is large enough to engage to an inner surface of the side wall 35 of the external member 30 and its open end side is formed into an outer flange 56.

Figure 3:
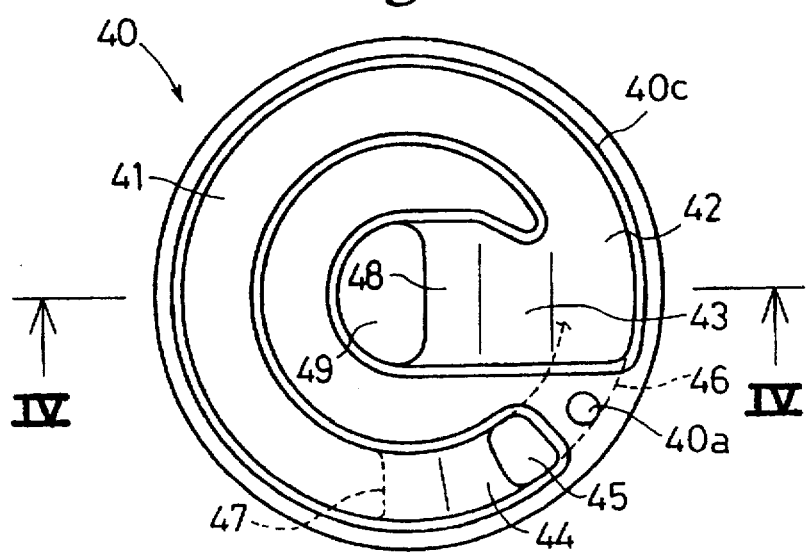
FIG. 3 is a top plan view of a passage member.
Figure 4:
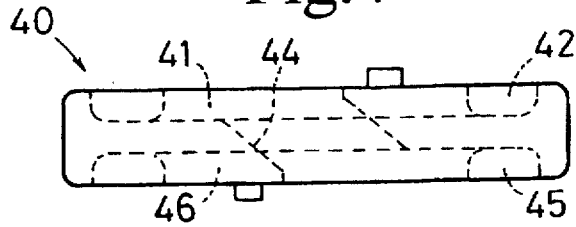
FIG. 4 is a sectional view taken along the line IV—IV of FIG. 3.
Figure 5:
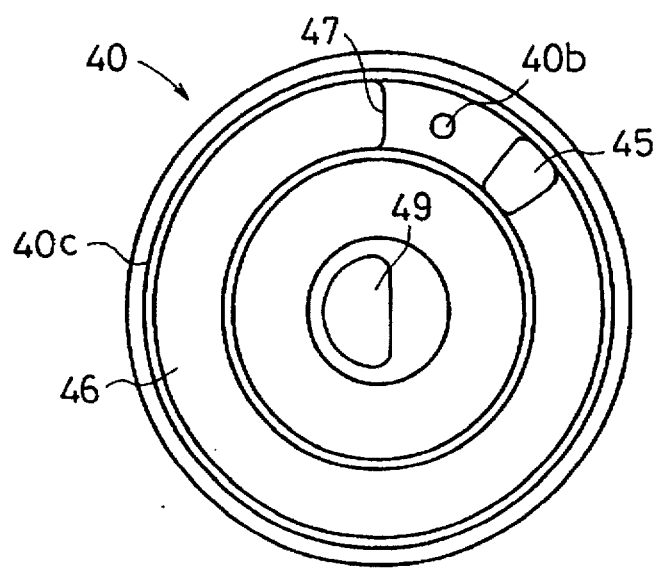
FIG. 5 is a bottom plan view of a passage member.

As show also in FIG. 3 through FIG. 5, particularly in a plan view of FIG. 3, the passage member 40 has its upper surface provided with a circular groove 41 whose one end is connected to a common depression 42 communicating with the common inlet 32, and another end is connected to a lower communicating port 45 through a slant face 44 and to a circular groove 46 formed in a lower surface (FIG. 5). An end portion 47 of the circular groove 46 is in communication with the first outlet 52.

Meanwhile, the common depression 42 is connected to a liner groove 43 extending toward the center. As it is apparent from FIG. 2B which is longitudinal sectional view taken along the line IV—IV of FIG. 3, the linear groove 43 is constituted by a slant wall 48 extending toward the lower surface center from the common depression 42 and a vertical wall 43a formed approximately vertically and facing the slant wall 48.

A space expanding upwardly inside the passage member 40 is formed by the linear groove 43 and a lower portion of the space is connected to a lower opening 49 open at a lower center portion. The lower opening 49 is in communication with the second outlet 53.

The passage member 40 includes a comparatively thick member using a suitable material such as rubber and in the vicinity of the common inlet 32 on its upper surface, a positioning protrusion 40a engaging to the positioning hole 33 is formed, and between the communicating port 45 and end portion 47 on its lower surface a positioning protrusion 40b engaging to the positioning hole 54 is formed. Furthermore, ring sealing protrusions 40c are formed around the upper and lower surfaces.

As shown in FIG. 2, when the passage member 40 and the internal member 50 are pressed into the external member 30 and the upper and lower positioning protrusions 40a, 40b are respectively engaged into the positioning holes 33, 54, a damping orifice 60 is formed along the circular groove 41, slant portion 44 and circular groove 46 and the idle orifice 61 is formed along the linear groove 43.

The damping orifice 60 is a long orifice which is always open and communicating from the common inlet 32 communicating with the first chamber 8 to the second chamber 9 from the first outlet 52 through the circular groove 41 along the upper portion 31, slant face 44 and further through the circular groove 46 along the upper portion 51. This orifice is tuned to have a resonance point in a low-frequency vibration region (5 to 15 Hz).

The idle orifice 61 is a short orifice communicating the first chamber 8 and the second chamber 9 through the linear groove 43. This orifice is tuned to have a resonance point in an idle vibration region (20 to 40 Hz).

The idle orifice 61 extends from the common inlet 32 to the common depression 42, slant portion 44 and further to the second outlet 53 and its sectional passage area is considerably large as compared with its length. The common depression 42 is a common inlet space of the damping orifice 60, idle orifice 61 communicating with the common inlet 32.

Next, the operation of the present embodiment mode is described. In FIG. 1, since the negative pressure is not supplied to the closed space 25 and the second outlet 53 is closed by the valve portion 21 during the usual running condition, only the damping orifice 60 communicates the first chamber 8 and the second chamber 9 to exhibit an appropriate attenuation characteristic and dynamic spring characteristic.

Though a high attenuation must be obtained for comfortable ride against vibration in a low-frequency region (to 15 Hz), in the case of present embodiment mode, it can be realized by tuning the resonance point of the long damping orifice 60 to the low-frequency vibration region.

Hereupon, the internal pressure rise in the first chamber 8 at the time of resonance in the damping orifice 60 can be absorbed by elastic deformation by tuning the valve portion 21, valve body 23 connected thereto and the return spring 27 in advance, thus the dynamic spring characteristic can be changed into a low-dynamic spring condition.

Next, in the idle vibration region (20 to 40 Hz), the dynamic spring must be considerably reduced. When the negative pressure is applied to the closed space 25 then, since the valve portion 21 is pulled downward against the valve body 23 and an elasticity of the return spring 27 to open the second outlet 53, the first chamber 8 and the second chamber 9 communicate by the idle orifice.

Thereby, working fluid in the first chamber 8 and the second chamber 9 flows through the idle orifice 61 to produce the resonance. And hence, the resonance point changes to the idle vibration region tuned to the idle orifice 61, thereby a sufficient low-dynamic spring is obtained.

Since the second outlet 53 is shifted toward the flowing direction of the fluid from the center of the valve portion 21, when it is pulled downward it can be open obliquely to allow the fluid to flow smoothly for rapid switching. The return spring 27 also returns the valve portion 21 rapidly.

Furthermore, in an input vibration region above the idle revolution in the general running condition, since it is required to be the low-dynamic spring, the idle orifice 61 is closed by the valve portion 21. Then, even though the resonance point of the damping orifice 60 is not in the resonance region, the internal pressure can be absorbed by the cylindrical portion 5 and elastic deformation of the movable wall portion 12 formed at a portion of the cylindrical portion 5.

Particularly, since the movable wall portion 12 can be deformed elastically comparatively freely, the internal pressure produced by vibration of the engine is absorbed partially by the movable wall portion 12, as a result the low-dynamic spring condition can be realized.

When the deformation restricting portion 14 contacts the outer cylinder 15 in controlling movement of the movable wall portion 12, it is restricted from moving further and the absorption of internal pressure by its elastic deformation becomes smaller. And hence, high attenuation can be realized.

Furthermore, since the valve portion 21 is formed in a unit with the diaphragm 7 in the present embodiment mode, a special seal for the working fluid is not necessary.

Also, since there is no mechanical sliding portion which produces a severe abrasion by opening and closing the valve portion 21, the durability is considerably improved.

Furthermore, since a special magnetic fluid is not used as the working fluid, variations in the performance due to environmental changes such as temperature and the like can be made remarkably smaller, thus the performance is guaranteed reliably.

In addition, when the valve portion 21 is formed on the face which is approximately perpendicular to a main input direction z of vibration to be prevented, the valve portion 21 and its control unit can be situated easily. Also, the fluid resistance produced at the time of movement of the valve portion 21 is reduced, facilitating the control of movement by the negative pressure and simplifying a controlling structure of the internal pressure, thus an entire structure of a device is simplified and the number of component parts is reduced, thus resulting in a lower cost.

Besides, when the outside of the movable wall portion 12 is covered by a rigid outer cylinder 15 and a portion of which is made thick to form a deformation restricting portion 14 which protrudes toward the outer cylinder 15, a dynamic spring constant is changed by the deformation restricting portion 14 which approaches to and separates from the outer cylinder 15, a nonlinear spring characteristic corresponding to the magnitude of the input vibration is exhibited and the durability of the movable wall portion 12 can be improved.

Figure 8:
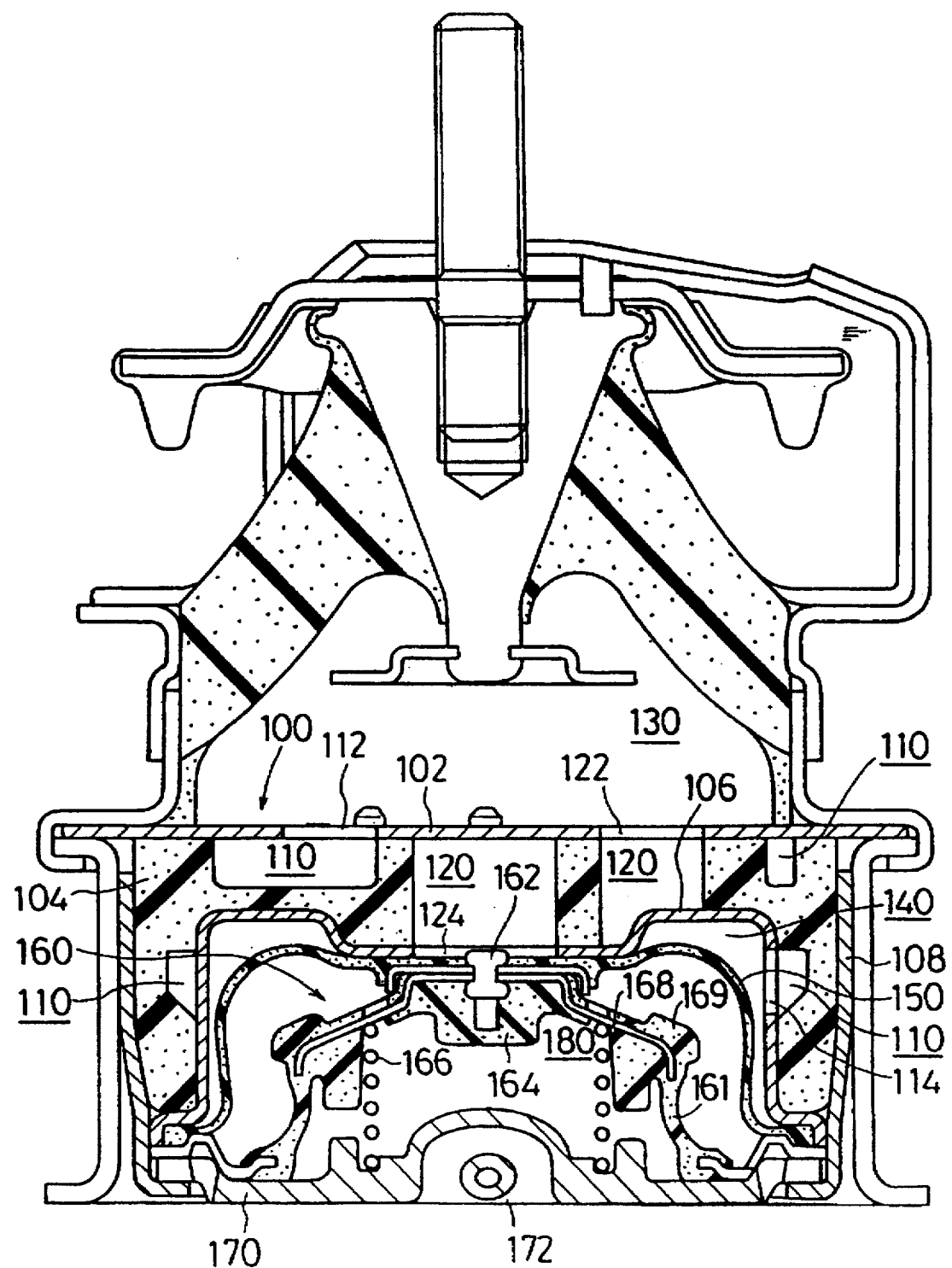
FIG. 8 is a sectional view taken along the line VIII—VIII of FIG. 9 of an engine mount according to another embodiment mode.
Figure 9:
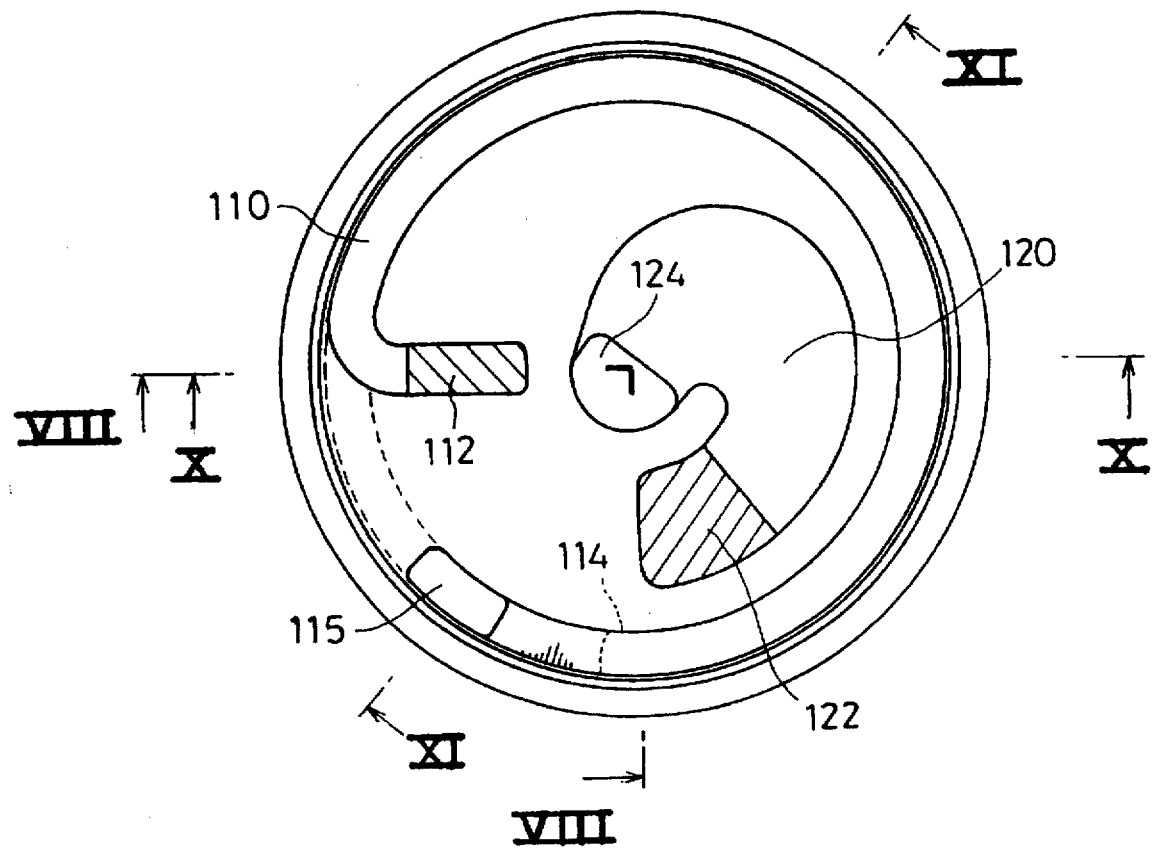
FIG. 9 is a plan view of a passage member thereof.
Figure 10:
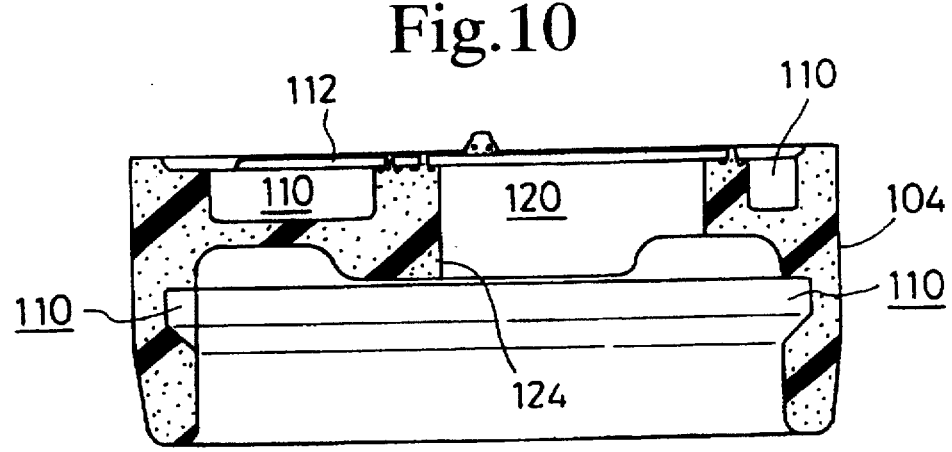
FIG. 10 is a sectional view taken along the line X—X of FIG. 9.

Next, another embodiment mode is described with reference to FIG. 8 through FIG. 12, wherein FIG. 8 is a longitudinal sectional view taken along the line VIII—VIII of FIG. 9 of an engine mount according to the another embodiment mode, FIG. 9 is a plan view of a passage member and FIG. 10 is a sectional view taken along the line X—X of FIG. 9.

In the present embodiment mode, as it is apparent from FIG. 8 through FIG. 11, a long damping orifice 110 having a small passage section area is formed in two stages at a peripheral side of a partitioning member 100, the upper and lower stages being communicated by an upper and lower communicating passage 115. A short idle orifice 120 having a large passage section area is formed radially within the damping orifice 110.

As shown in FIG. 8, the partitioning member 100 is constituted by overlapping an external member 102, a passage member 104, an internal member 106 and a peripheral member 108.

On the side of first chamber 130 above the partitioning member 100, a damping orifice inlet 112 which is an inlet of the damping orifice 110 and an idle orifice inlet 122 which is an inlet of the idle orifice 120 are formed. Meanwhile, on the side of second chamber 140 beneath the partitioning member 100, a damping orifice outlet 114 is an outlet of the damping orifice 110 and an idle orifice outlet 124 which is an outlet of the idle orifice 120 are formed.

Accordingly, it is so constructed that the damping orifice 110 enters the lower orifice from the damping orifice inlet 112 through the upper and lower communicating passage 115 after turning round about 7 to 8 times in the upper orifice (refer to FIG. 11), and after turning round about 7 to 8 times in the lower orifice, reaches the damping orifice outlet 114.

The second chamber 140 is partitioned by the partitioning member 100 and the diaphragm 150 to which a valve body 160 for opening and closing the idle orifice outlet 124 is mounted by means of a rivet 162 so as to be movable in a unit with the vertical movement of the valve body 160.

A metal plate 168 for closing the idle orifice outlet 124 reliably is provided on the valve body 160, on a shoulder portion of which a stopper 169 made of a rubber member is disposed for preventing abrasion caused by the contact between the metal plate 168 diaphragm 150.

A bottom plate 170 is mounted to the lower side of the valve body 160, thereby forming an air chamber 180. A rubber seal 164 for sealing the rivet 162 and a return spring 166 for urging the valve body 160 upward are provided in the air chamber 180.

Figure 11:
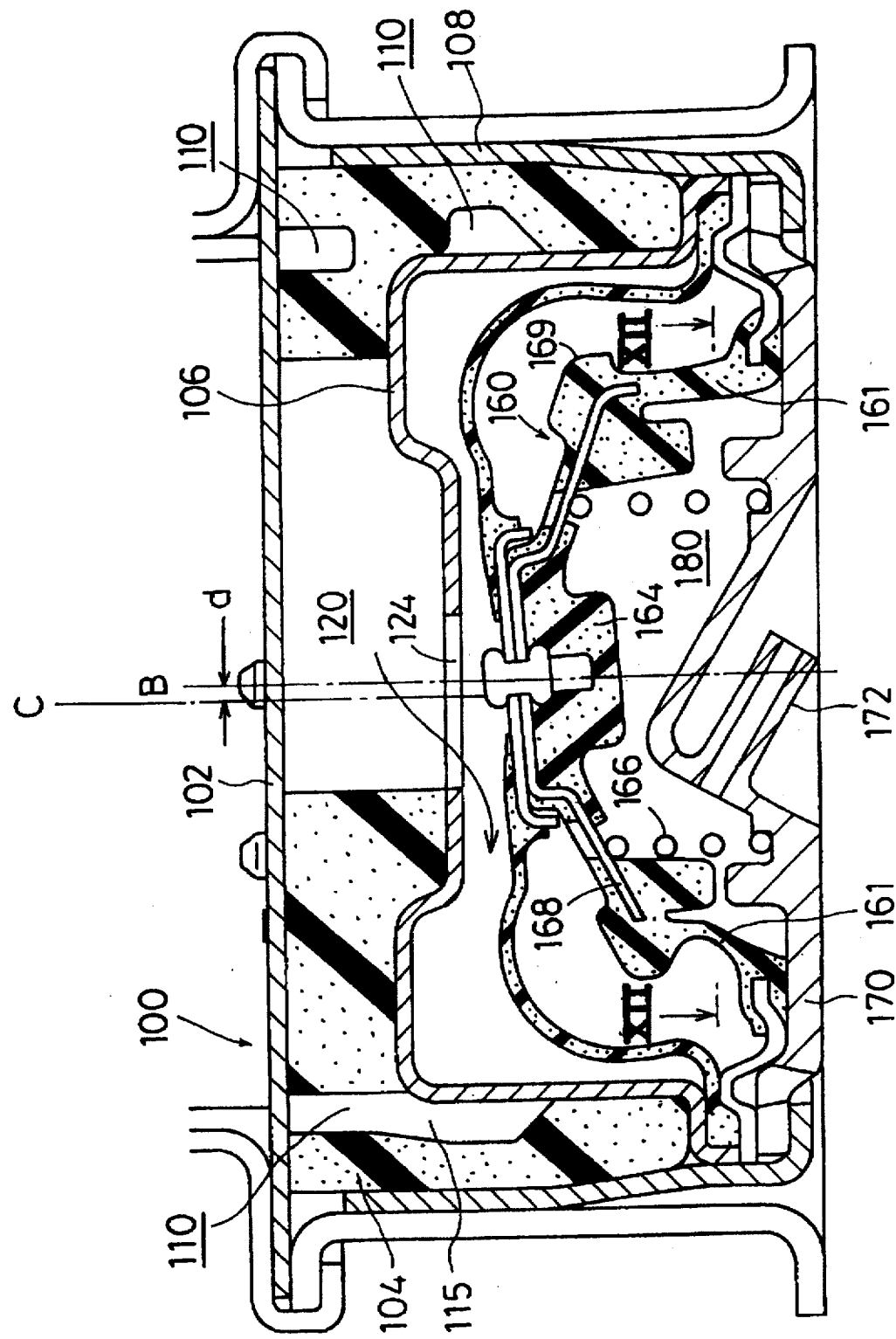
FIG. 11 is an enlarged sectional view taken along the line XI—XI of FIG. 9 at the time of opening operation of a valve body.
Figure 12:
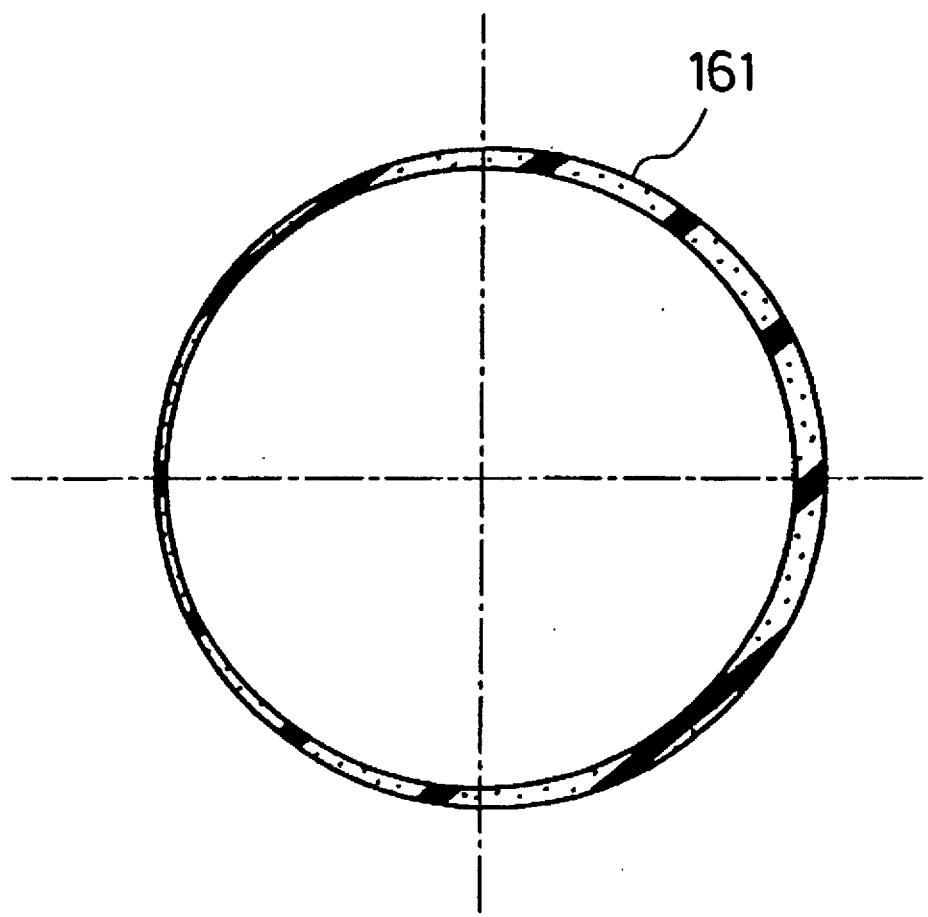
FIG. 12 is a sectional view taken along the line XII—XII of FIG. 11 of a side wall of a valve body.

As it is apparent from FIG. 11 which is an enlarged sectional view taken along the line XI—XI of FIG. 9, though the center B of the valve body 160 is positioned at the center of the engine mount, the center C of the idle orifice outlet 124 is shifted therefrom by d toward a flowing direction of the fluid flowing through the idle orifice 120. The metal plate 168 is so formed that a radius from the center B on the left-hand side in FIG. 11 is shorter than the right-hand side. Meanwhile, a side wall 161 of the valve body 160 is so formed that its thickness on the left-hand side in FIG. 11 is thinner than the right-hand side (refer to FIG. 12).

A connecting pipe 172 is provided obliquely on the bottom plate 170 as slanting about 45 degree to the idle orifice outlet 124, the connecting pipe 172 being connected to a negative pressure source (not shown).

Next, the operation of the present embodiment mode is described. As it is apparent from FIG. 11 showing an enlarged view in the vicinity of the idle orifice outlet 124, since the center C of the idle orifice outlet 124 is shifted by d toward a flowing direction of the fluid flowing through the idle orifice 120 from the center B of the valve body 160, the fluid flowing from the first chamber 130 to the second chamber 140 through the idle orifice 120 presses the left-hand side of the valve 160 in FIG. 11, thus the valve body 160 slants toward the left-hand side.

Furthermore, since the connecting pipe 172 is provided as slanting toward the left-hand side in FIG. 11, when the air chamber 180 is depressurized by the negative pressure source, the internal pressure in the air chamber 180 becomes more negative in the left-hand side than the right-hand side in the figure, thus the valve body 160 slants the left-hand side so as to be pulled downward easily.

Also, in FIG. 11, since the thickness of the left-side wall 161 of the valve body 160 is formed thinner than the right-hand side, the valve body 160 slants toward the left-hand side and opens easily. Furthermore, since a left-side radius of the periphery of the metal fitting 168 is made smaller than a right-side radius an occupying ratio of the metal member of the valve body 160 is less on the left-hand side than the right-hand side than the right-hand side, as a result a rubber elasticity becomes lower on the left-hand side of the valve body 160, slanting toward the left-hand side so as to be open easily.

Since the valve body 160 slants toward the flowing direction of the fluid flowing through the idle orifice 120 and opens as such, the fluid flows smoothly through the idle orifice 120 and near the idle orifice outlet 124. And hence, the idle orifice outlet 124 can be opened and closed smoothly, results in a rapid switching of fluid-sealed mount characteristics. Abrasion caused by the contact between the diaphragm 150 and the metal plate 168 disposed on the valve body 160 can be prevented by the stopper 169. Furthermore, since the diaphragm 150 and the valve body 160 are riveted by the rivet 162, it is easy to manufacture, and since the rivet 162 is sealed by the seal rubber 164, the air chamber 180 can be sealed reliably.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fluid-sealed type anti-vibration rubber device comprising, a first connecting member mounted to one of a car body side or a vibration member side, a second connecting member mounted to the other of the car body side or the vibration member side, and a rubber block disposed between said first connecting member and said second connecting member, a closed space being formed by a portion of said rubber block, said closed space being partitioned into a plurality of liquid chambers by a partitioning member, said liquid chambers being communicated by a short idle orifice having a large passage section area and a long damping orifice having a small passage section area provided in the partitioning member, said idle orifice being open by a valve only during idling and said damping orifice being always open, wherein said partitioning member includes a first side and a second side and has a passage member therebetween to partition said liquid chambers, said passage member having a predetermined thickness, said first side having an abutting surface upon which said valve seats, said idle orifice has an outlet opening in said abutting surface forming a portion of said valve and an inlet opening in said second side, said idle orifice outlet opening and said idle orifice inlet opening not overlappingly aligned in the direction of thickness, said passage member having a liquid passage communicating said inlet opening and said outlet opening of said idle orifice, said liquid passage including a groove which varies in depth in the direction of thickness so as to be deeper at said outlet opening than at said inlet opening such that fluid flowing through said liquid passage is provided with a flow inclined to said first side from said inlet opening to said outlet opening and a flow line of fluid flowing out from said outlet opening is inclined to said first side, and wherein the outlet center of said idle orifice is shifted from the center of said valve toward a flowing direction of fluid flowing through said idle orifice such that when said valve opens, said valve inclines obliquely to said first side under the pressure force of fluid flowing from said outlet opening.

2. The device in accordance with claim 1, wherein said idle orifice extends linearly in a radial direction of said partitioning member and said damping orifice has a circular shape surrounding said idle orifice.

3. The device in accordance with claim 1, wherein either one of inlet openings or outlet openings of said damping orifice and said idle orifice is used commonly.

4. The device in accordance with claim 1, wherein said outlet opening of said idle orifice is opened and closed by said valve which is elastically deformable.

5. The device in accordance with claim 4, wherein said valve is constituted by a portion of a diaphragm.

6. The device in accordance with claim 1, wherein at least a portion of said rubber block constituting said liquid chamber is made to elastically deform easily.

7. The device in accordance with claim 1, wherein said valve further includes a portion of a diaphragm, a metal plate for closing said idle orifice outlet opening and a stopper being provided at a contacting position of said metal plate and said diaphragm.

8. The device in accordance with claim 7, wherein a radius from the center of a periphery of said metal plate is formed smaller on an outlet side of said idle orifice than the opposite side.

9. The device in accordance with claim 1, wherein said valve is controlled by the negative pressure and is constituted by a portion of a diaphragm and a valve body, the diaphragm and the valve body being riveted by a rivet whose valve body side is covered by a rubber seal.

10. A fluid-sealed type anti-vibration rubber comprising, a first connecting member mounted to one of a car body side or a vibration member side, a second connecting member mounted to the other of the car body side or the vibration member side, and a rubber block disposed between said first connecting member and said second connecting member, a closed space being formed by a portion of said rubber block, said closed space being partitioned into a plurality of liquid chambers by a partitioning member, said liquid chambers being communicated by a short idle orifice having a large passage section area and a long damping orifice having a small passage section area provided in the partitioning member, said idle orifice being open by a valve only during idling and said damping orifice being always open, wherein the outlet center of said idle orifice is shifted from the center of said valve toward a flowing direction of fluid flowing through said idle orifice, wherein said valve is controlled by a negative pressure and a connecting pipe connected to a negative pressure source is provided obliquely as slanting toward an idle orifice outlet side.

11. A fluid-sealed type anti-vibration rubber device comprising, a first connecting member mounted to one of a car body side or a vibration member side, a second connecting member mounted to the other of the car body side or the vibration member side, and a rubber block disposed between said first connecting member and said second connecting member, a closed space being formed by a portion of said rubber block, said closed space being partitioned into a plurality of liquid chambers by a partitioning member, said liquid chambers being communicated by a short idle orifice having a large passage section area and a long damping orifice having a small passage section area provided in the partitioning member, said idle orifice being open by a valve only during idling and said damping orifice being always open, wherein the outlet center of said idle orifice is shifted from the center of said valve toward a flowing direction of fluid flowing through said idle orifice, wherein a wall thickness of said valve is formed thinner on an outlet side of said idle orifice than the opposite side.

* * * * *